US 8,473,866 B2

(12) United States Patent
Cohen et al.

(10) Patent No.: US 8,473,866 B2
(45) Date of Patent: Jun. 25, 2013

(54) DECISION ASSISTANCE DEVICE AND METHODS OF USING SAME

(76) Inventors: Philip R. Cohen, Bainbridge Island, WA (US); Scott Lind, Woodinville, WA (US); David McGee, Bainbridge Island, WA (US)

( * ) Notice: Subject to any disclaimer, the term of this patent is extended or adjusted under 35 U.S.C. 154(b) by 289 days.

(21) Appl. No.: 11/872,533

(22) Filed: Oct. 15, 2007

(65) Prior Publication Data
US 2008/0184149 A1  Jul. 31, 2008

Related U.S. Application Data

(60) Provisional application No. 60/940,560, filed on May 29, 2007, provisional application No. 60/829,520, filed on Oct. 13, 2006.

(51) Int. Cl.
*G06F 3/048* (2006.01)
(52) U.S. Cl.
USPC ............ 715/819; 715/829; 715/850; 715/855
(58) Field of Classification Search
USPC ................. 715/713, 855, 818, 829, 832, 834, 715/836, 819, 850
See application file for complete search history.

(56) References Cited

U.S. PATENT DOCUMENTS

| 5,943,039 | A | 8/1999 | Anderson et al. | |
| 7,043,702 | B2 * | 5/2006 | Chi et al. | 715/853 |
| 7,853,896 | B2 * | 12/2010 | Ok et al. | 715/838 |
| 8,117,563 | B2 * | 2/2012 | Ok et al. | 715/848 |
| 2007/0214169 | A1 * | 9/2007 | Audet et al. | 707/102 |
| 2008/0049012 | A1 * | 2/2008 | Bar-Joseph et al. | 345/419 |

* cited by examiner

*Primary Examiner* — Namitha Pillai
(74) *Attorney, Agent, or Firm* — Richard C. Vershave; Foster Pepper PLLC

(57) ABSTRACT

A decision assistance device provides a user the ability to access and obtain actionable intelligence or other information to make tactical and strategic decisions. The decision assistance device allows the user to obtain information for future, near-future, and/or real time scenarios. The device advantageously provides the information to the user in a manner that minimizes an amount of attention and interaction required by the user while still permitting the user to rapidly manipulate the device while moving down a desired decision path. The decision assistance device may take a physical or virtual form.

8 Claims, 7 Drawing Sheets

DECISION ASSISTANCE DEVICE AND METHODS OF USING SAME

CROSS REFERENCE TO RELATED APPLICATIONS

This application claims priority to and incorporates by reference in its entirety U.S. Patent Provisional Application Ser. No. 60/940,560 filed May 29, 2007.

This application claims priority to and incorporates by reference in its entirety U.S. Patent Provisional Application Ser. No. 60/829,520 filed Oct. 13, 2006.

GOVERNMENT RIGHTS

The invention was made with Government support under contract W31-P4Q-05-C-0282 awarded by the U.S. Army Aviation and Missile Command. The Government has certain rights in the invention.

COPYRIGHT NOTICE

This disclosure is protected under United States and International Copyright Laws. ©2007 Adapx. All Rights Reserved. At least a portion of this document contains material which is subject to copyright protection.

FIELD OF THE INVENTION

The invention relates generally to a decision assistance system and methods for using the same in a dynamic environment, such as on or proximate to a military battlefield. More specifically, the invention relates a decision assistance system that may take the form of a physical or virtual device that may be manipulated by a user in a heads-up configuration and which cooperates with the user to assist in making at strategic decision.

BACKGROUND OF THE INVENTION

Various decision assistance systems exist that permit users to negotiate a menu system and/or otherwise interact with the device to make a desired decision. For example, one type of conventional decision assistance system utilizes a geographic positioning system (GPS) with a conventional graphical user interface (GUI) displayed on a conventional display screen. The system operates to assist the user in finding a desired route to a desired destination. Such systems are commonly referred to as GPS systems and may be used in a variety of vehicles. In military ground vehicles, for example, the system may be mounted in a dash panel of the vehicle so that it may communicate with other on-board systems and still reside within an armored portion of the vehicle.

One drawback of such existing systems is that menu selection (e.g., the ability to select different functions or aspects of the system) may be awkward or difficult when the user is engaged with other activities, such as driving, which means the user may have to avert their eyes from a higher priority task to view the display screen of the device. In a military environment, the aspect of not maintaining a "heads-up" posture at all times during a critical situation may impact the safety and viability of the user, the user's squad, and other personnel within a vicinity of the user.

SUMMARY OF THE PARTICULAR EMBODIMENTS

In one embodiment, a decisional assistance system for assisting a user in making a decision is described. The decisional assistance system includes a first set of information carrying panels arranged on a first housing unit; a second set of information carrying panels arranged on a second housing unit, the second unit telescopically and rotationally coupled to the first housing unit, wherein at least two of the second set of information carrying panels and at least two of the first set of information carrying panels are visible to the user when the second housing unit is telescopically extended from the first housing unit, and wherein the second set of information carrying panels are rotatable relative to the first set of information carrying panels; and an amount of information presentable on at least the first set of information carrying panels, the information including data to assist the user in making the decision, for example a real-time strategic decision on a military battlefield.

BRIEF DESCRIPTION OF THE DRAWINGS

Embodiments of the decision support interface and related systems and methods are described in the following figures.

DETAILED DESCRIPTION OF THE PARTICULAR EMBODIMENTS

Figure 1:
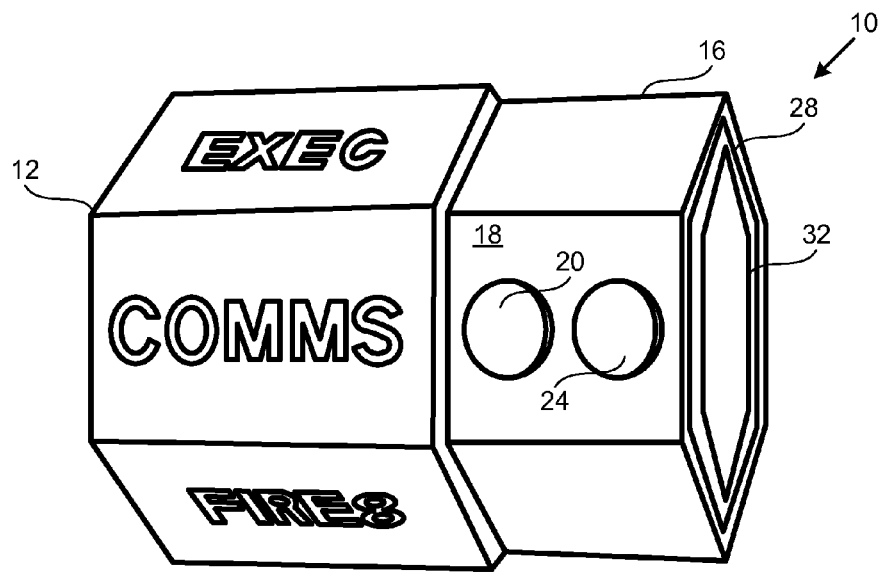
FIG. 1 schematically illustrates an embodiment of a decision support data interface device.

In one embodiment of the invention, a decision assistance device takes the form of a virtual device displayed on a display screen or visibly projected through other known means (e.g., a holograph). Preferably and in such an embodiment, the "virtual" decision assistance device is generated on a display screen as a digital image (e.g., an icon) that is manipulatable by a user and permits the user to receive, access, process, transmit, and otherwise utilize an amount of data that is generally considered important to the user and, in turn, assists the user in making a tactical and/or strategic decision. The "virtual" decision assistance device may further allow the user to make the decision with respect to future, near-future, or real-time situations. Preferably, the "virtual" decision assistance device is configured and displayed such that it provides a minimal distraction to the user while allowing the user to utilize the device in a "heads-up" posture. In a particular embodiment, the "virtual" decision assistance device permits a military personnel member to readily manipulate the device and obtain assistance in making a real-time battlefield decision.

In another embodiment of the invention, a decision assistance device takes the form of a physical device having a plurality of panels, status indicators, and operable switches to toggle various panels with respect to one another. Some of the panels may take the form of individual display screens for visibly displaying or projecting an amount of information. The panels are generally configured to present a common set of attributes or information categories. Preferably the "physical" decision assistance device takes the form of a plurality of housings nested within one another and operable to telescope or otherwise extend and retract relative to one another. The plurality of panels are located on at least one of the housings. Likewise, the "physical" decision assistance device is manipulatable by a user through biometric, hand, voice, or other means, and permits the user to receive, access, process, transmit, and otherwise utilize an amount of data that is generally considered important to the user and, in turn, assists the user in making a tactical and/or strategic decision. In addition, the telescoping aspect of the "physical" decision assistance device permits the device to operate as a cascading data menu where the most important, crucial, urgent and/or critical information appears on the uppermost levels of the device. The "physical" decision assistance device may further allow the user to make the decision with respect to future, near-future, or real-time situations. Preferably, the "physical" decision assistance device may attachable or otherwise managed by the user such that it provides a minimal distraction to the user while allowing the user to utilize the device in a "heads-up" posture. In a particular embodiment, the "physical" decision assistance device permits a military personnel member to readily manipulate the device and obtain assistance in making a real-time battlefield decision.

It is appreciated that aspects and features of the aforementioned embodiments may be combined or re-arranged to provide equivalent or enhance functionality. For example, the decision assistance device may take the form of a physical unit that is manipulated by the user to obtain an amount of information on a remote display system. Thus, the decision assistance device may be directly manipulatable by the user, virtually manipulatable by the user, or some combination thereof to allow the user to receive, access, process, transmit, and otherwise utilize an amount of data. The data may be utilized using alphanumeric or other characters, aural signals, visual signals, or some combination thereof where the data in provided in a hierarchal relationship as a result of the telescoping feature of the device.

Each face or panel of the decision assistance device provides a decision support interface in which the information presented depends on a sequence or combination of sequences selected by the user, where being selected by the user includes the user receiving a prompt from the device to proceed in a predetermined sequence. The panels may be configured to provide a common set of attributes that present attribute related information.

As noted, the decision assistance device may take the form of a physical device, a virtual device in the form of a visual model object presented on a computer or other display screen and in signal communication with a computer processor, or some combination thereof. By way of example, the virtual device may be a graphical computer icon representation of the physical device that is responsive to computer executable instructions configured and the panels of the virtual device operate as graphical user interface displayable on a computer monitor or screen, a handheld display, or a wearable eyepiece display, which may otherwise be referred to as a heads-up display (HUD).

The icon data visual tool may provide contemporaneous information of a geometric or physical space without distracting or minimizing situation awareness of an observer of the geometric or physical space. Embodiments are adaptable to field use in which an apparatus having a display to present the visual tool that allows users performing field tasks requiring a high level of situational awareness or a region or physical space to be able to remain engaged in their tasks, while at the same time monitoring parameters that may affect the accomplishment of their task.

Alternate embodiments include a decision support interface for field use construction herein the same can be utilized by users performing field tasks requiring a high level of situational awareness. More specifically, the invention give users an opportunity for remaining engaged in their tasks, while at the same time monitoring parameters that may affect the accomplishment of their tasks.

FIG. 1 schematically illustrates a perspective view of an embodiment of a decision support data interface device 10. The decision support device 10 includes a plurality of information selectors of diminishing size that is in declining proportion to the importance of the previous selector. This allows a user the rapid ability to drill down into the status and of a critical situation and plan accordingly. The information selectors may include multiple sub-divisions that can be associated in multiple hierarchal associations. The plurality of information selectors may be arranged under different hierarchal relationships so that different combinations of intelligence data or research data be obtained.

Figure 4:
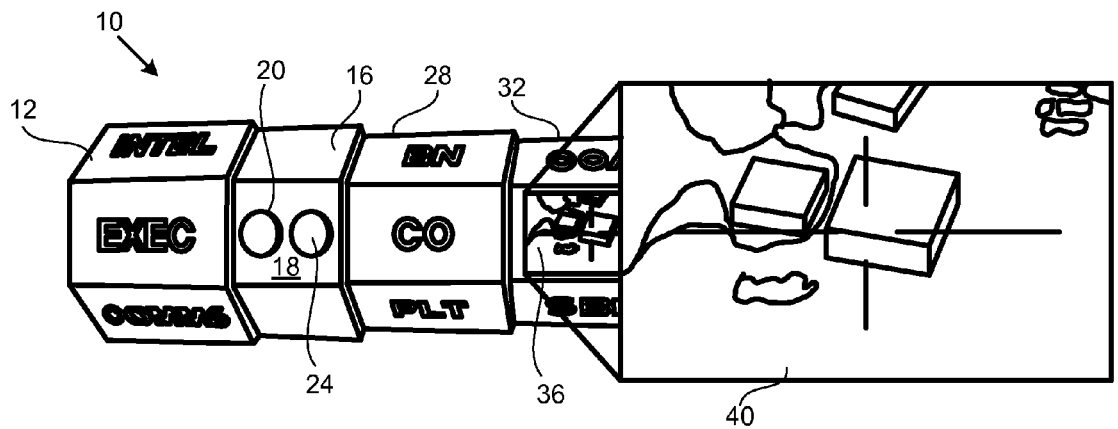
FIG. 4 schematically illustrates the embodiment of the decision support data interface device of FIG. 1 with extension of a surveillance selector from the support selector.

In the illustrated embodiment, the decision support interface device 10 may be hexagonally configured such that that extending or expanding hex nut shaped selectors may be expanded or telescopically moved with relation to each other and having the appearance of a hex bolt, as shown in FIG. 4. By way of example, the large selector designates a number of menus or categories of information, while the smaller selector provides a further delineation the of the information which is preferably related the menu of the large selector from which it extends. Thus, the extending selectors, as telescopically depicted, present or provide relational-based information in a hierarchal or organized arrangement.

The decision support interface device 10 may have a variable number of faces, giving rise to different three-dimensional shapes onto whose faces information is presented, including but not restricted to hexagonal displays and cylindrical displays upon which information is placed in strips. The specific content of the information presented on each face or strip is application specific and may vary. Similarly, the mechanism used to indicate status may employ a variety on means, as described in the context of status tiles 18. The number of extruded elements or selectors, and the language/ devices used to command changes may be incorporated into the interface device 10. The headings described herein are for exemplary purposes only and are not intended to limit or modify the scope of the invention.

In one embodiment the decision support interface device 10 includes a task selector 12, a status selector 16 extending from the task selector 12, a group or echelon selector 28 that is informationally related to the status selector 16, and a surveillance selector 32 that informationally related to the echelon selector 28. The selectors 12, 16, 28, and 32 and may be hexagonally shaped nut, but may assume other polygon forms. The information visible on the task selector are INTEL for intelligence, EXEC for execution, and FIRES for firefight or battle engagement. Other tasks may include LOG for logistics and COMM for communications. The headings described herein are for exemplary purposes only and are not intended to limit or modify the scope of the invention.

Stowed internally are a concentrically positioned support selector 28 and a concentrically stowed surveillance selector 32 within the support selector 28. A status surface 18 of the status selector 16 includes status lights 20 and 24. Status lights 20 and 24 may be illuminated with different light colors, including green, yellow, amber, and red. The colors may signify different status definitions as described in the legend of FIG. 3 below. Here the status lights 20 and 24 are illuminated with the same color, for example, green.

Figure 2:
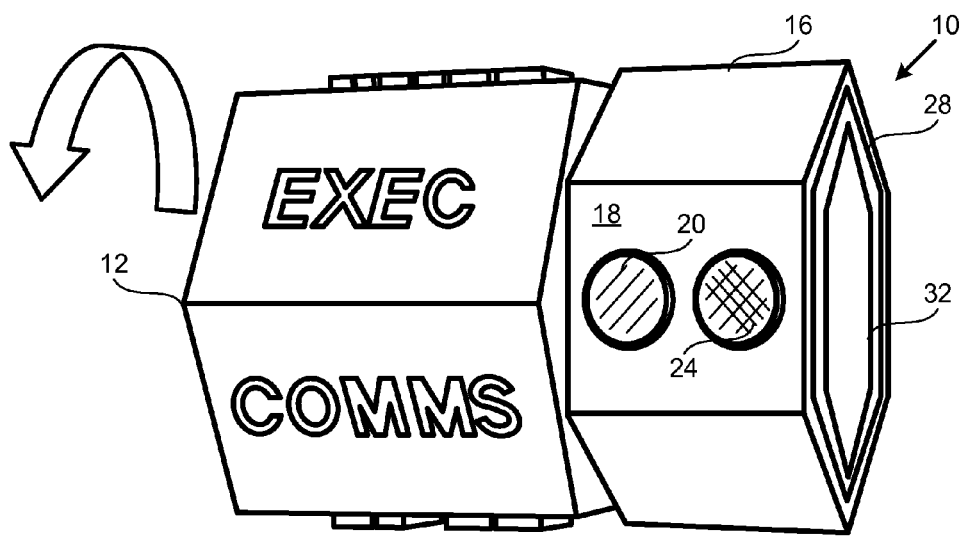
FIG. 2 schematically illustrates the embodiment of the decision support data interface device of FIG. 1 with rotation of a task selector.

FIG. 2 schematically illustrates the embodiment of the decision support data interface device 10 of FIG. 1 with rotation of the task selector 12. Rotation may be by direct manipulation of a user or by activation of a motor in which the nut turns like a wheel and stops at preset turn points. Motor activation may include physically touching a circuit button to activate the motor or via circuitry configured to execute voice activation.

During rotation the status lights 20 and 24 may assume different colors, or remain the same. In this illustration, the colors are shown to be yellow for status light 20 and red for status light 24.

Figure 3:
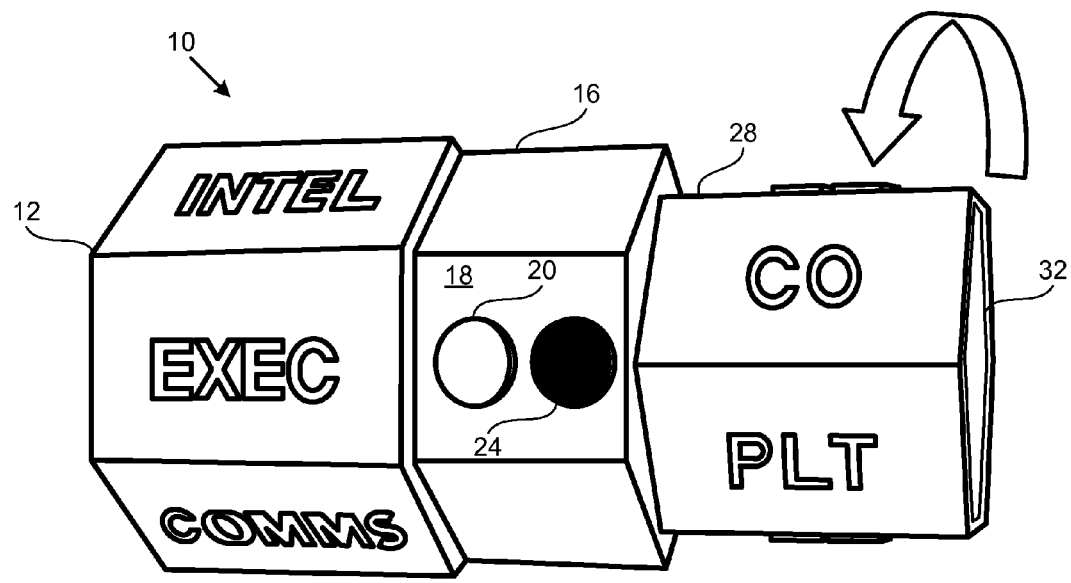
FIG. 3 schematically illustrates the embodiment of the decision support data interface device of FIG. 1 with extension and rotation of rotation of a support scenario selector from the status selector.

FIG. 3 schematically illustrates the embodiment of the decision support data interface device of FIG. 1 with extension and rotation of the echelon selector 28 from the status selector 16. The support designations visible on the support selector include CO for company and PLT for platoon. Other designations may include BATT for battalion. The headings described herein are for exemplary purposes only and are not intended to limit or modify the scope of the invention.

FIG. 4 schematically illustrates the embodiment of the decision support data interface device of FIG. 1 with extension of a surveillance selector 32 from the support selector 16. A display or image window 36 is shown on one of the hex faces of the surveillance selector 32. In this embodiment, an overhead reconnaissance image conveyed from an unmanned aerial vehicle is presented in window 36. The image within window 36 may be magnified or projected onto a transparent surface 240.

A military user could use the decision support interface device 10 in a multiple of settings to acquire actionable intelligence. For example, a user could examine the status of COMMs, Execution, and Logistics, in this sequence, by using a variety of multimodal commands to cause the corresponding information to be displayed (becoming the current tile). More detailed information related to the current tile can be obtained by commanding the interface to "extrude" another 3D segment, allowing the user to select specific aspects to examine within the main one, e.g. by looking at the specifics at a Battalion level, within a main EXEC tile. Extrusion can in turn be applied to subsegments as well, causing additional, more detailed information to be displayed, following the same principle described above. Similarly to rotations, extrusions can be commanded multimodally by e.g. the use of voice, a pen, haptic device input, etc. DCDS tiles can present textual information (such as the labels of the information being presented), status indicators (similar to Status Tiles' displays), maps, and live feeds (e.g. from an Unmanned Vehicle—UV). The headings described herein are for exemplary purposes only and are not intended to limit or modify the scope of the invention.

Figure 5:
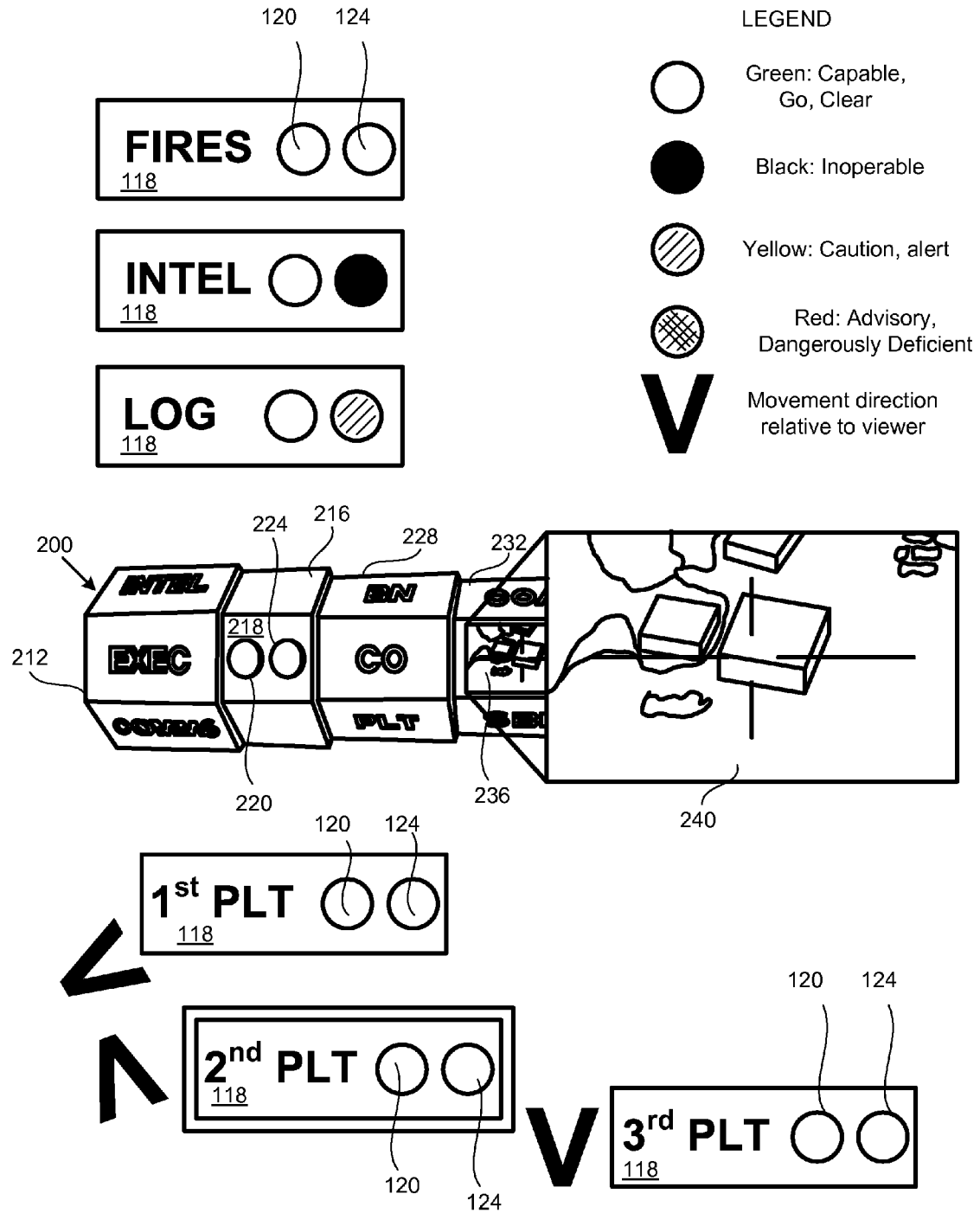
FIG. 5 schematically illustrates a portion of a screenshot depicting an embodiment of a graphic decision support icon interface similar to the device depicted in FIG. 4 nearby a set of status tile icons.

FIG. 5 schematically illustrates a portion of a screenshot visible in a user heads up display (HUD) depicting an embodiment of a graphic decision support icon interface 200 similar to the device depicted in FIG. 4 nearby a set of status tile icons 118. The screenshot may be created from computer systems having a display and configured to execute software instructions to display the graphic decision support icon interface 200 and status tile icons 118. The status tiles icons indicate the current and future state of each functional area related to the performance of a task employing a user-definable number of status indicators (e.g. disks displaying different colors) representing different conditions. The state of functional areas related to a task (e.g. a mission or an operation) may also be represented via the status tile icons 118.

Similar to the decision support interface device 10 of depicted in FIGS. 1-4, the decision support icon interface 200 illustrates a hex bolt like expanded interface in which selectors of diminishing importance may be rotated to rapidly and unobtrusively ascertain situation intelligence. In this illustration, the decision support icon interface 200 presents a 3D graphical object, e.g. a hexagon shaped expanded bolt in which status information relevant to a task is furthermore presented in a dynamic, comparative manner. The decision support icon interface 200 provides a graphical display mechanism that provides the ability for a user to keep aware of the main parameters influencing a task at each phase, while being able to "drill down", or obtain detailed related information in an unobtrusive way. Multiple icon status tiles 118 onto the surfaces the selectors of the icon interface 200. Like the interface 10 selectors that may be physically turned, the selectors of the icon interface may be virtually turned or rotated. The three-dimensional rendition of the icon interface 200 enables the user to see the current tile, but at the same time shows the prior and subsequent faces, taking advantage of 3-D and/or perspective view to render these secondary options. Multimodal user commands can be used to rotate the segment, e.g. via speech (e.g., "Show COMMS status"), use of a pen, or haptic device input such as a tangible set of wheels worn on the uniform. Another example of "drilling down" to acquire useful information or actionable intelligence is when the user asks to see the plan against a map is projected on the heads up display. Users can furthermore enter information, e.g. adding details or changing a plan via multimodal input, for instance by writing and sketching with a pen on digital paper, using voice, haptic devices, or communications thereof.

The icon interface 200 includes a task selector 212, a status selector 216 extending from the task selector 212 that is inferior in importance to the task selector 212, an echelon selector 228 that is inferior in importance to the status selector 216, and a surveillance selector 232 that is inferior in importance to the echelon selector 228. The selectors 212, 216, 228, and 232 and may be hexagonally shaped nut, but may assume other polygon forms. The tasks visible on the task selector are INTEL for intelligence, EXEC for execution, and COMM for communication. Other tasks may include LOG for logistics and FIRES for firefight or battle engagement. A virtual display or image window 236 is shown on one of the hex faces of the surveillance selector 232. In this embodiment, the aerial image of an unmanned aerial vehicle contained in window 232 may be magnified in image expansion window 240. An overhead reconnaissance image showing buildings is conveyed from an unmanned aerial vehicle and presented in the expansion window 240. The headings described herein are for exemplary purposes only and are not intended to limit or modify the scope of the invention.

Icon status lights 220 and 224 may are shown located on a status surface 218 of the status selector 216. The status lights 220 and 224 of the icon interface 200 may assume different colors, or remain the same. In this illustration, the colors are shown to be green for icon status lights 220 and 224.

The status icons 118 may represent a military entity, such as an echelon, or an armored unit, that may be further categorized according to task assignment and directionality in relation to the position of a viewer. The task assignments may include LOG for logistics, INTEL for intelligence, FIRES for firefight or battle engagement, and EXEC for execute. Status icon lights 120 and 124 may be colored coded to convey further military meaning experienced by the military entity. For example, green to designate a planned or on-going capable operation, a go-ahead command, a clear situation. Black may convey an inoperable or unachievable objective. Yellow may mean a caution or alert. Red to convey a dangerously deficient advisory.

The status icons 118 may also be associated with the direction indicator, here depicted as a V-shaped arrowhead. The direction indicator may be orientated to convey movement described in Cartesian coordinates, clock or radial descriptions, or otherwise defined in polar coordinate terms. In this exemplary illustration, a first platoon or $1^{st}$ PLT is moving in an approximate 8 o'clock direction, a second platoon or $2^{nd}$ PLT is moving in an 11 o'clock position, and a third platoon or $3^{rd}$ PLT is moving in a 6 o'clock position. The $2^{nd}$ PLT status icon 118 is highlighted, as indicated by a double border, by physically touch controls or by vocal communication conveyed by the user with the computer executed software. The V-shaped arrowhead or directional indicator ("^") may acquire different colors (i.e., yellow) to signify whether there is a problem in platoon movement. Should a problem develop, the HUD display may also include a moving red ball along the periphery of the display next to nearby that platoon having difficulty or otherwise exposed to danger.

Referring still to FIG. 5, the status tile icons 118 may concern functional areas and subordinate elements in a military use scenario. In this instance, multiple tiles 118 may be used. For example, an instance to represent the status of subordinate units, showing to a military company leader the current and future status of his three platoons. Besides the status, an indicator pointing to the general locations relative to the commander provides directional information. Because the tiles are intended to be displayed in the periphery of the user's vision, color changes may not be noticed. To compensate for this fact of human perception, the system can set a highlight into motion around one of these tiles, to call the user's attention to it. Multiple motions (paths, speeds, and periodicity) can help distinguish one from another from peripheral vision. The status tiles icons 118 may also indicate the current and future state of each functional area related to the performance of a task employing a user-definable number of status indicators (e.g. disks displaying different colors) representing different conditions.

Performance of each of a variable number of functional areas related to the performance of a task is represented via status icon indicators 120 and 124 contained within the status tile icon 118. The icon indicators 120 and 124 provide a user-definable number of disks for which colors representing different conditions can be defined. These can be used for example in a military mission indicating the status relative to the current state, and to planned future states, such as phases or missions representing the status as capable (green), degraded (yellow), dangerously deficient (red), or inoperable (black). See legend for symbolic representations of colors.

The specific shape, colors, number of status icon indicators 120 and 124 (e.g. color disks) may vary. Status icon tiles 118 may be represented by shapes other than rectangles, for instance circles, polygons, or other shapes. The status icon indicators 120 and 124 may use other mechanisms, e.g. dials, or graphs. Status icon tiles 118 may furthermore be positioned within different areas of a display, an HUD, e.g. along the borders, or grouped to one side, etc. Colors, when used, may employ different color schemes, or use a gradation of colors ranging over a spectrum (e.g. different shades of a color, or a display ranging from one color to another, for example blue to red).

Figure 6:
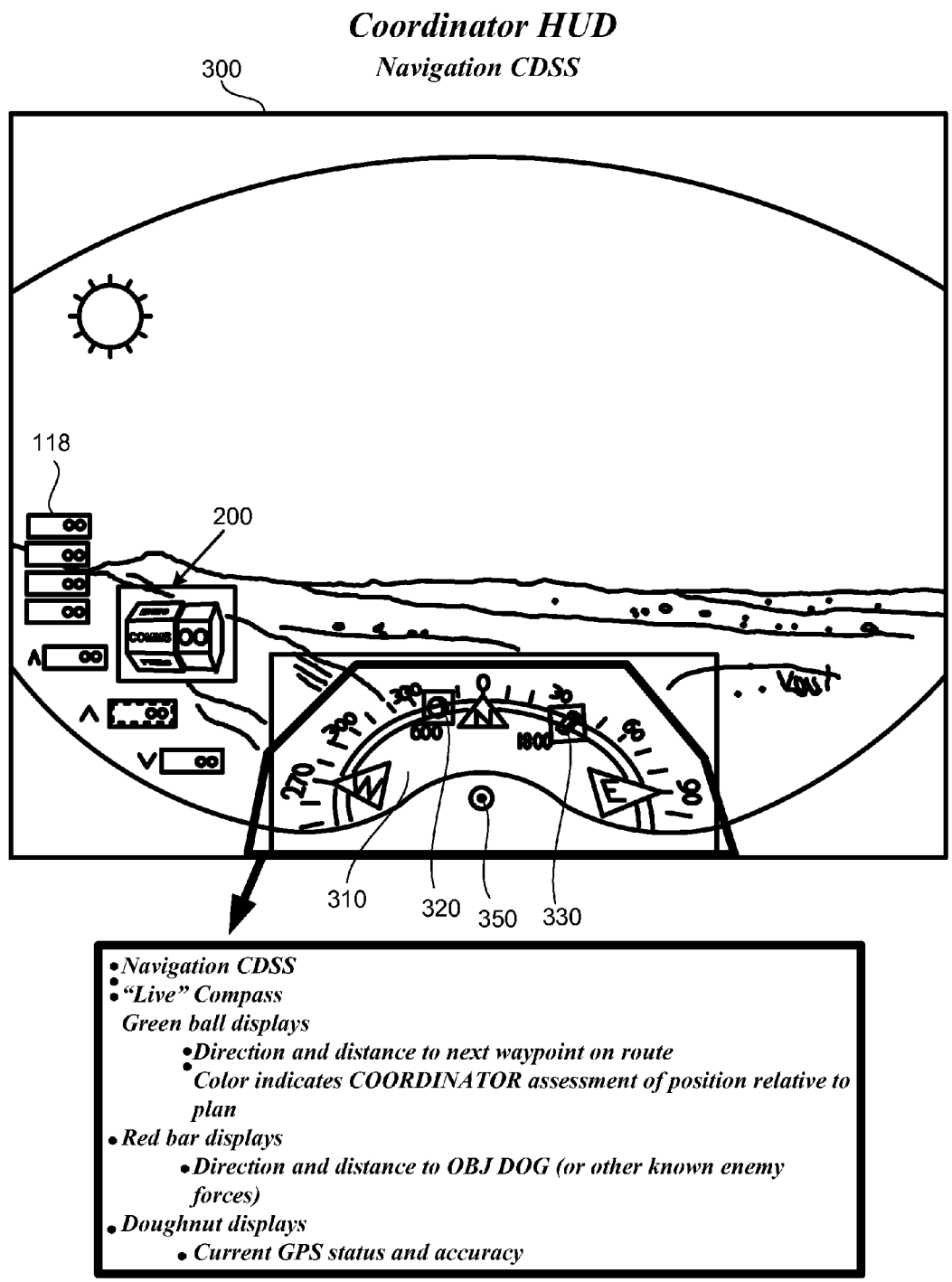
FIG. 6 schematically illustrates an embodiment of the graphic decision support icon interface of FIG. 5 similar to the device depicted in FIG. 1 projected within a navigation display of a Coordinator and having a "live" virtual compass projection.

FIG. 6 schematically illustrates an embodiment of the graphic decision support icon interface 200 of FIG. 5 similar to the device 10 depicted in FIG. 1 projected within a navigation display presentable to a user HUD. The user HUD may be a eyeglass or goggle-mounted display, a computer display or a handheld data device display positioned to encourage the user to be in a heads up configuration. Here the navigation display includes a command decision support (CDSS) screenshot 300 that is visible to a Coordinator HUD. The navigation screenshot 300 includes a "live" or active virtual compass projection 310. The compass projection 310 includes a ball 320, a red bar 330, and a doughnut shaped GPS activity-and-accuracy indicator 350. Status tile icons 118 and their relative position are defined by the adjacently positioned direction indicators.

The ball 320 defines the compass direction to the next waypoint on route. The color of the ball 320 may change to other colors described for the status icons of FIG. 5, namely green, black, yellow, and red. When the ball 320 is green, the next waypoint may be capably reached. The color of the ball 320 may also convey the Coordinator's assessment of position relative to a military plan similar to the status light legend of FIG. 5. The red bar 330 conveys the direction and distance to a known enemy military entity.

Figure 7:
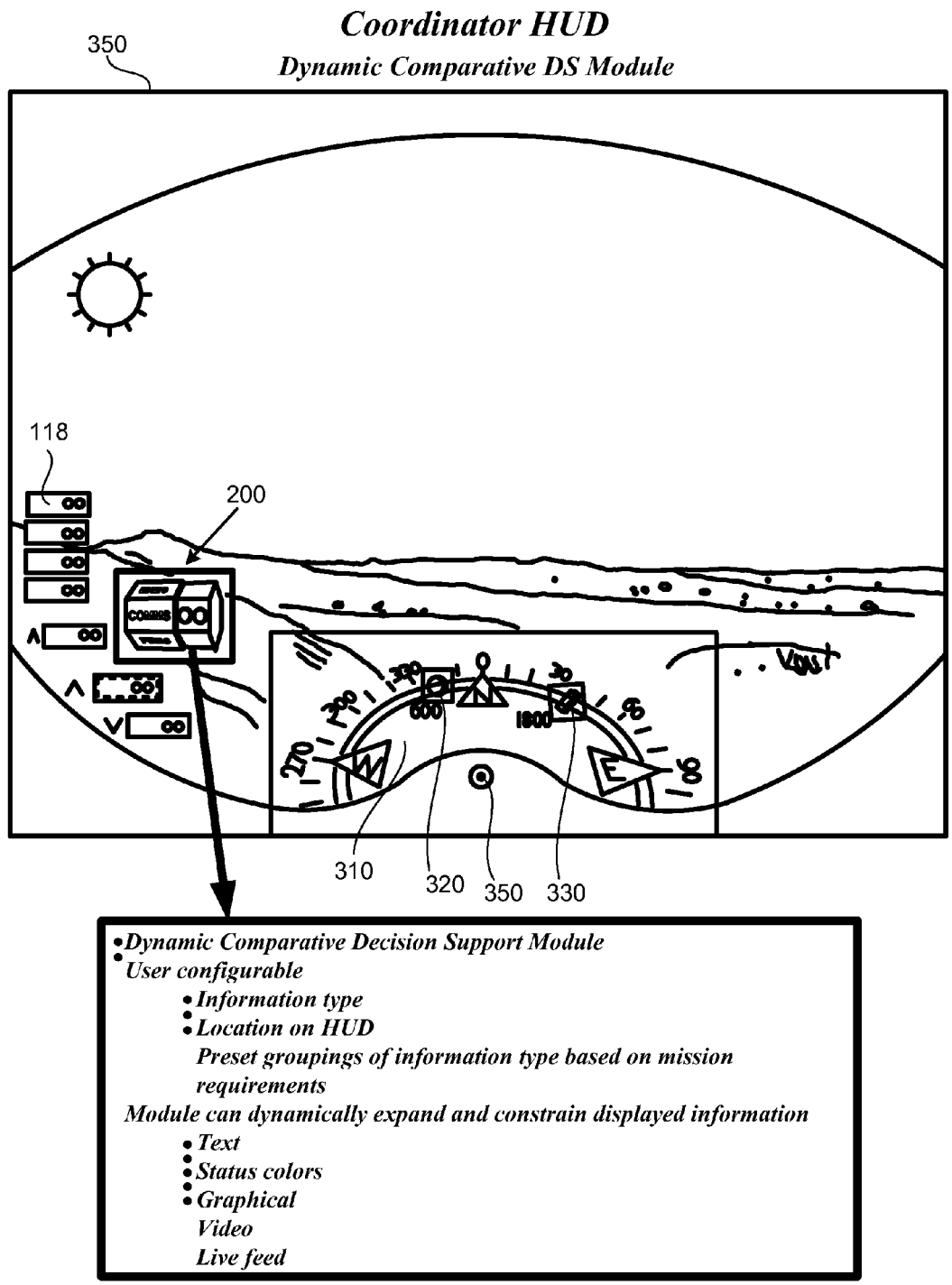
FIG. 7 schematically illustrates an embodiment of the graphic decision support icon interface of FIG. 5 similar to the device depicted in FIG. 1 projected within a navigation display of a Coordinator's viewpoint with the graphic icon interface highlighted or activated to deliver intelligence or other dynamic information.

FIG. 7 schematically illustrates an embodiment of the graphic decision support icon interface of FIG. 5 similar to the device depicted in FIG. 1 projected within the navigation display of a Coordinator's HUD with the graphic icon interface highlighted or activated to deliver intelligence or other dynamically acquired information and provides a basis to dynamically compare changing intelligence data. The highlighting is indicated by a heavy bar perimeter placed around the icon interface 200. The icon interface 200 is user configurable by information type and may be re-positioned within the HUD. The activation may be by voice command and that conveys instructions from the user to the icon interface 200 to be ready to present any or all of text, status colors, graphical, historic and/or live audio-video information.

Figure 8:
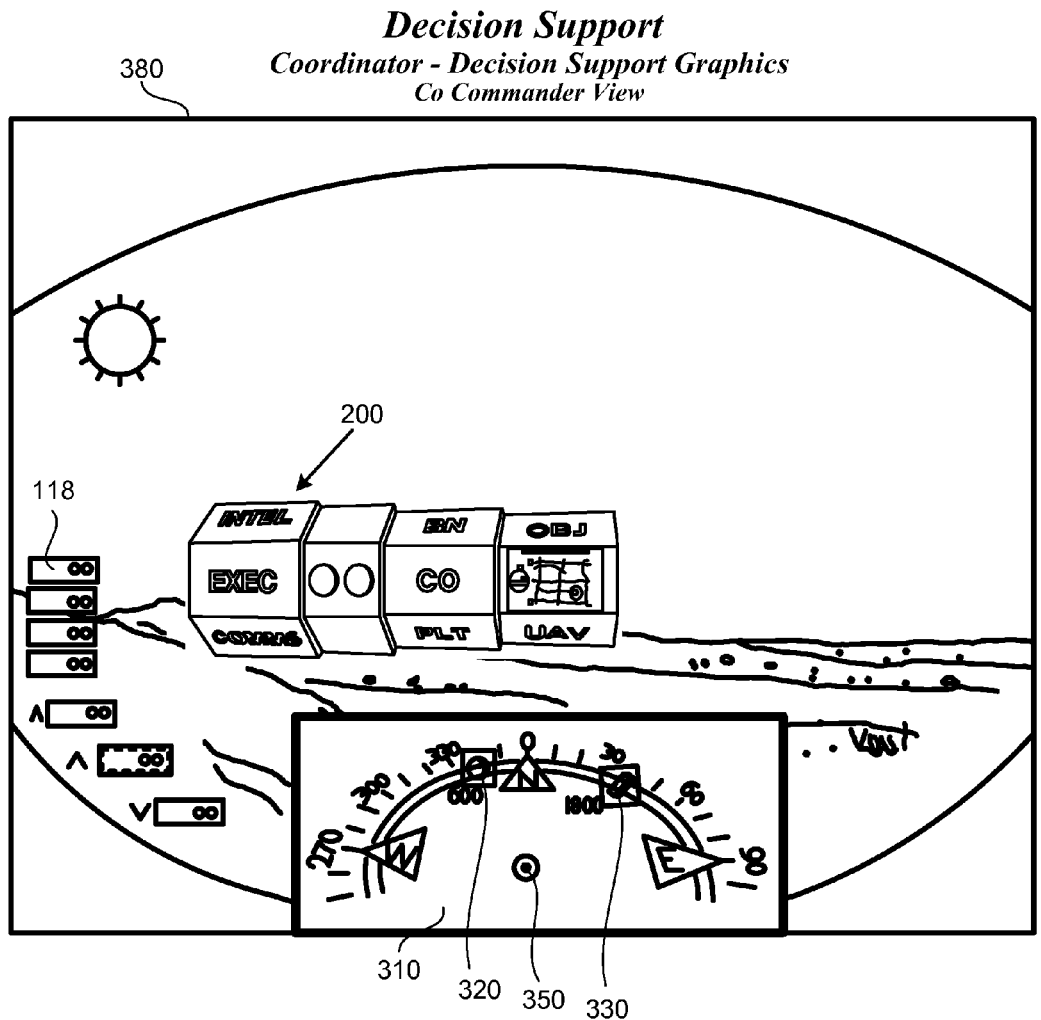
FIG. 8 schematically illustrates an embodiment of the graphic decision support icon interface of FIG. 5 similar to the device depicted in FIG. 4 projected within a navigation display of a Decision Support coordinator.

FIG. 8 schematically illustrates an embodiment of the graphic decision support icon interface of FIG. 5 similar to the device depicted in FIG. 4 projected within the HUD navigation display of a Decision Support Coordinator. In this embodiment, a map of military value is located in the image window 236 of the surveillance selector 232. A map projection having an expanded or magnified image may extend from the image window 236 similar to the overhead reconnaissance image presented in the expansion window 240 of FIG. 5. In an exemplary military scenario of a Commander's interaction with the Coordinator, the interaction with the icon interface 200 in screenshot 380 could begin by voice commands from the Commander speaking "Dismiss Option 2, Display Execution Options, Show Graphics". The Coordinator when then here audio message conveyed by the icon interface 200 "Dismissing Option 2—displaying Execution Options", then "showing graphic Options at company level", whereupon the icon interface 200 extends the surveillance selector 232 to present the map window 236. The Commander then receives enough real-time actionable intelligence to support a decision and commands "Display phase one completion, allow $1^{st}$ PLT to arrive at 9BF, request additional ARES to accomplish SBF mission, and task $3^{rd}$ PLT with SBF mission" wherein 9BF, ARES, and SBF are military abbreviations conveying military locations, mission, and/or tactics.

Figure 9:
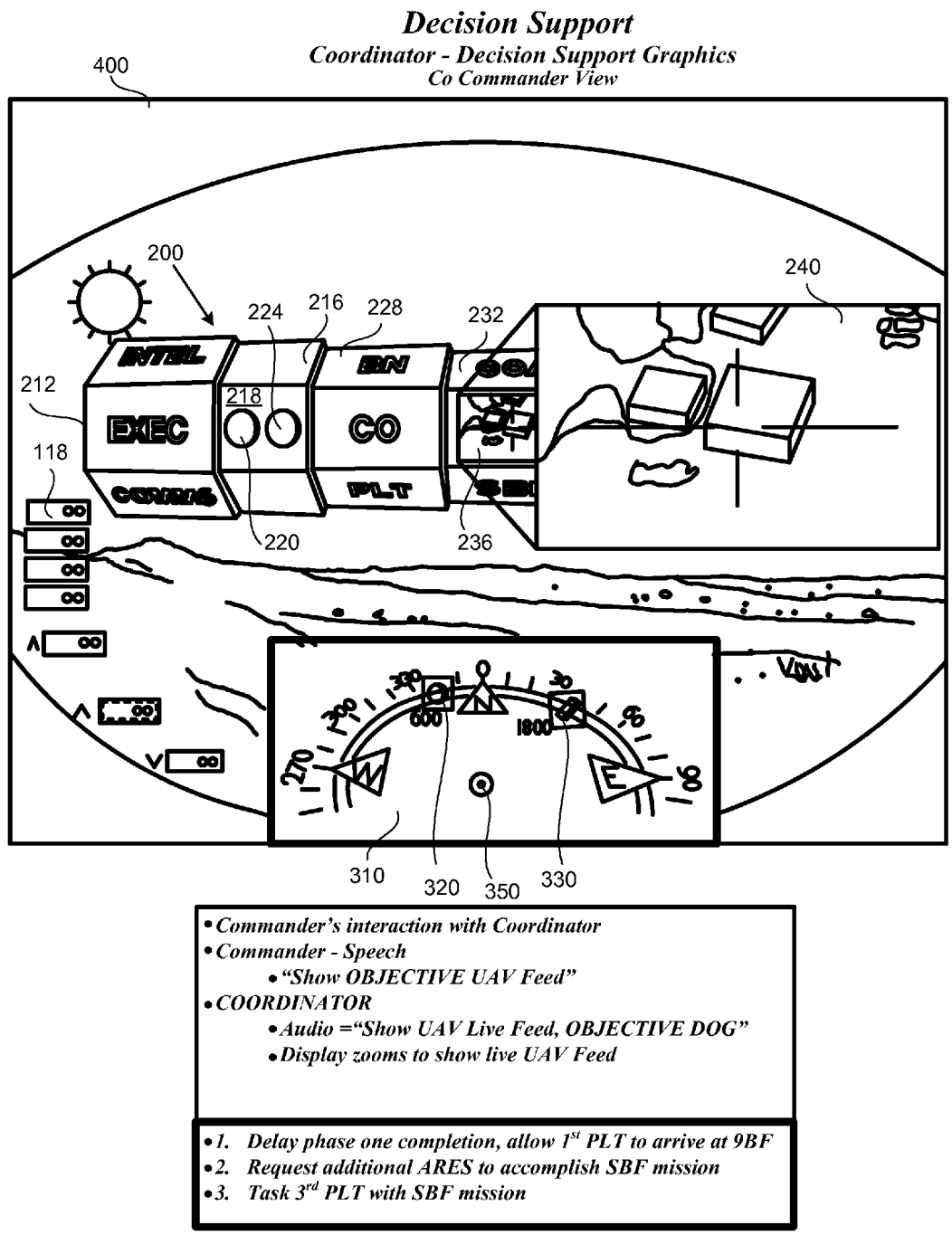
FIG. 9 schematically illustrates an embodiment of the graphic decision support icon interface of FIG. 5 similar to the device depicted in FIG. 4 projected within a navigation display of a Decision Support coordinator and illustrating a magnification of the intelligence image projected from the surveillance selector.

FIG. 9 schematically illustrates an embodiment of the graphic decision support icon interface of FIG. 5 similar to the device depicted in FIG. 4 projected within a field of view of a Decision Support coordinator viewed by a company commander. Here a magnification of the overhead reconnaissance intelligence image 240 projected from the surveillance selector 232, and along with status icons 118, presents substantial real-time actionable intelligence to support a decision and in which the company commander orders by voice command, "Show objective UAV live Feed of Objective Dog". The icon interface 200 provides the projection 240 to provide a zoomed in display of the live unmanned aerial vehicle (UAV) feed. The company commander then receives enough real-time actionable intelligence to support a decision and commands "Display phase one completion, allow $1^{st}$ PLT to arrive at 9BF, request additional ARES to accomplish SBF mission, and task $3^{rd}$ PLT with SBF mission" wherein 9BF, ARES, and SBF are military abbreviations conveying military locations, mission, and/or tactics.

The HUD navigational displays of FIGS. 6-9 tracks the user position relative to the ongoing plan. It provides current heading and distance to the next waypoint, information about entities of interest (for example the position of opposing forces), and the status of GPS and other location-finding devices. The Navigational Display provides overall location related information, tracking the user's current position and heading against e.g. a pre-established route to be followed and other entities of interest for the task (e.g. the position of opposing forces). An example Navigational Display may for instance consists of a live compass, a marking for direction and distance to next waypoint on route (shown as a green ball 320 in FIGS. 6-9), a marker indicating the position and distance to other targets of interest (shown as a red bar 330 in FIGS. 6-9), and a doughnut shaped GPS activity-and-accuracy indicator 350.

The navigational display's appearance of FIGS. 6-9 may vary to add or reduce information displayed, e.g. by omitting compass markings, or by adding information regarding elements of interest, e.g. their speed. Multiple elements of interested might be displayed simultaneously. The actual appearance of the indicators are variable—one could find different shapes, colors to represent them; additional information is similarly subject to variations—one can for instance replace the numeric information with one in which color is used (e.g. by having element proximity, or velocity, etc as points within a color spectrum, or quantized against a fixed palette). Similarly, the Bearing indication may be represented by a variety of shapes and colors. The Compass rendition may be replaced by other underlying spatial representations, e.g. a map showing present position and positions of next waypoints, and of other elements of interest. The location of this element within a display may vary, e.g. being positioned on top of the display, or on one of its sides.

The icon interface 200 within the navigational displays of FIGS. 6-9 furthermore makes use of transparency, colors and movement patterns in such a way as to call the users' attention without distracting them from their main task. The number of elements, positioning, actual rendition and content, e.g. the specific nature of the information displayed within the status icon tiles 118 depend on the specific application area, such as in the military, firefighting, law enforcement, or emergency response.

Other embodiments of the decision support icon interface 200 introduced include presenting the status of team members and their organizational units along relevant dimensions (location, activity, mission, logistics, communications, etc.), per plan phase, if required; the ability to interact with a control center or coordination entity without unduly impairing situational awareness; the ability for user to select options presented by a control center or coordination entity; the ability to view and modify a planned course of action (COA) or plan that has been presented against a map; the ability to interact with a control center or coordination entity in a hands-free fashion if the situation so requires; the ability to drill down into status and plan; to be able to coordinate in noisy environment (when speech would be difficult); the ability to interface with software systems related to a control center or coordination entity; avoid clutter and save screen territory, and to avoid the extra selection, menu, and window manipulation operations.

To attain the foregoing, the decision support icon interface 200 generally comprises 1) status tile icons 118, 2) the decision support icon interface 200 that provides a DCDS capability—that is, a Dynamic Comparative Decision Support, and 3) a navigational display in the form of a HUD. The Dynamic Comparative Decision Support (DCDS) capability of the icon interface 200 provides the status of functional areas relevant to the task (e.g. COMMS, Execution, Logistics, etc, in a military scenario) relative to current and planned future positions using a Status Tile on each face of a 3D display element. The navigational displays of depicted in FIGS. 6-9 above tracks the user position relative to the ongoing plan. It provides for instance current heading and distance to the next waypoint, information about entities of interest (for example the position of opposing forces), and the status of GPS and other location-finding devices.

In terms of capabilities, the solution described here contemplates a heads-up form factor appropriate to field use; interface does not unnecessarily obstruct user's view of the world, by using periphery of the visual field or by using transparency; an ability to interact with the display at any time and situation; an ability to call user's attention using motion rather than just graphics or audio; an ability to present current location and status of related entities of interest, e.g. units; a display having multimodal processing, enabling users to speak, select, sketch, etc. to support field coordination; an ability to show status at a glance; and an ability to show changes using motion in the user's peripheral vision.

Another embodiment of the decision support icon interface 200 is adapted for field use that overcomes the shortcomings of the prior art mechanisms. This decision support interface fits the requirements of users performing field tasks requiring a high level of situational awareness. By employing the mechanism here described, users may be able to remain engaged in their tasks, while at the same time monitoring parameters that may affect the accomplishment of their tasks.

Another particular embodiment provides an interface for field use that incorporates multimodal interaction, specifically voice and pen-based interaction, as well as tangible devices, which enables users to control a display and to enter data without loosing awareness of the situation around them. Yet, another particular embodiment provides an interface for field use that takes advantage of peripheral vision to signal events of interest to users, while introducing a reduced level of disruption in their capability for continued monitoring of the situation around them. The decision support interface 200 for field use incorporates color changes and movement frequency and direction as a way to unobtrusively signal events of interest. Moreover, the decision support interface provides under field use a generic graphical tool that augments menu selection with multimodal interaction. Another particular embodiment of the decision support interface enables a user to sketch on a paper map while seeing the results on a display.

While the particular embodiments have been illustrated and described, many changes can be made without departing from the spirit and scope of the invention. For example, the decision support interface is not limited to military situations but also may be used in any scenario requiring rapid user interaction under stressful conditions. The information selectors may be rearranged to have different levels of importance. For example, a surveillance selector may be rearranged to have a superior informational position to the status selector. With respect to the above description then, it is to be realized that the optimum dimensional relationships for the parts of the invention, to include variations in size, materials, shape, form, function and manner of operation, and assembly and use. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A physical hardware device for viewing tactical information, the device comprising:
 a computer monitor on which is displayed a first plurality of panels bearing tactical information, each of the first plurality of panels selectively viewable along a peripheral line of sight from a user;
 a second plurality of panels bearing tactical information having a three-dimensional hierarchical interrelationship with the information provided by the first plurality of panels, each of the second plurality of panels selectively extendable from and viewable with one of the corresponding first plurality of panels along the peripheral line of sight; and
 a multimodal interface in communication with the panels, the multimodal interface configured to be capable of receiving information from the user,
  said information receivable from the user via one or more modalities selected from the set of modalities comprising voice commands, handwritten information, or a combination of voice commands and handwritten information that transforms into viewable information on at least one of the first or second plurality of panels,
 the multimodal interface configured to process the received information and provide instructions for rotating the panels to display desired tactical information,
 wherein the panels are selectively viewable while simultaneously providing the user with a desired amount of situational awareness of a real time environment.

2. The device of claim 1, wherein at least one of the panels includes task related tactical information.

3. The device of claim 1, wherein at least one of the panels includes status related tactical information.

4. The device of claim 1, wherein at least one of the panels includes military echelon information.

5. The device of claim 1, wherein at least one of the panels includes terrain tactical information.

6. The device of claim 1, wherein at least one of panels includes surveillance tactical information of a region of interest in the real time environment.

7. The device of claim 1, wherein the handwritten information includes sketches made by the user.

8. The device of claim 1, wherein the handwritten information includes handwriting made by the user.

* * * * *